(12) United States Patent
Yasuda et al.

(10) Patent No.: US 6,324,843 B1
(45) Date of Patent: Dec. 4, 2001

(54) HYDRAULIC-MECHANICAL TYPE CONTINUOUSLY VARIABLE TRANSMISSION FOR VEHICLE

(75) Inventors: Kazuhiro Yasuda; Tsutomu Hayashi; Toru Iizuka; Hiroyuki Kikuchi, all of Saitama (JP)

(73) Assignee: Honda Giken Kogyo Kabushiki Kaisha

( * ) Notice: Subject to any disclaimer, the term of this patent is extended or adjusted under 35 U.S.C. 154(b) by 0 days.

(21) Appl. No.: 09/281,795

(22) Filed: Mar. 31, 1999

(30) Foreign Application Priority Data

Mar. 31, 1998 (JP) .................................................. 10-087530

(51) Int. Cl.$^7$ ................................................... F16D 39/00
(52) U.S. Cl. ................. 60/489; 60/490; 60/438; 60/441
(58) Field of Search ............................... 60/489, 490, 494, 60/438, 441

(56) References Cited

U.S. PATENT DOCUMENTS 4,916,901 * 4/1990 Hayashi et al. ........................ 60/489

FOREIGN PATENT DOCUMENTS 723746  3/1995 (JP) .

* cited by examiner

Primary Examiner—Christopher Verdier
Assistant Examiner—Thomas E. Lazo
(74) Attorney, Agent, or Firm—Birch, Stewart, Kolasch & Birch, LLP

(57) ABSTRACT

To moderate the efficiency of engine braking when it is applied while a continuously variable transmission produces a large transmission ratio. Such a continuously variable transmission is constituted by a hydraulic pump having an input rotary member connected to an internal combustion engine of a vehicle, a hydraulic motor having an output rotational axis connected to a driving wheel. The hydraulic pump and hydraulic motor are coupled via a first oil passageway, which has a low oil pressure during the normal load operation of the engine but has a high oil pressure during the reverse load operation of the engine, and a second oil passageway, which has a high oil pressure during the normal load operation but has a low pressure during the reverse load operation, thereby forming a closed oil passageway circuit. At least the hydraulic pump or the hydraulic motor has a variable capacity. A one-way clutch is interposed between an input rotary member and an output rotational axis in order to directly couple them as the output rotational axis rotates faster than the input rotary member during the reverse load operation.

20 Claims, 5 Drawing Sheets

HYDRAULIC-MECHANICAL TYPE CONTINUOUSLY VARIABLE TRANSMISSION FOR VEHICLE

BACKGROUND OF THE INVENTION

1. Field of the Invention

This invention relates to a hydraulic-mechanical type continuously variable transmission for a vehicle, in which a hydraulic pump having an input rotary member coupled to a vehicle engine and a hydraulic motor having an output rotational axis coupled to a driving wheel are connected via a first oil passageway that has a low oil pressure during a normal load operation of the vehicle engine but has a high oil pressure during a reverse load operation of the vehicle engine and a second oil passageway that has a high oil pressure during the normal load operation but has a low oil pressure during the reverse load operation, thereby forming a closed hydraulic circuit. At least either the hydraulic pump or the hydraulic motor has a variable capacity.

2. Description of Background Art

A continuously variable transmission of the foregoing type is well-known and disclosed in Japanese Patent Publication Hei7-23746, for example.

In the foregoing continuously variable transmission, when engine braking is applied, the hydraulic motor functions as a pump while the hydraulic pump functions as a motor. In such a case, a first oil passageway tends to have an increased oil pressure. Specifically, the first oil passageway connecting an outlet side of the hydraulic pump to an inlet side of the hydraulic motor constitutes a closed hydraulic circuit together with a second oil passageway connecting an outlet side of the hydraulic motor and an inlet side of the hydraulic pump. In order to prevent this problem, throttle valves are provided between the first and second oil passageways in an existing continuously variable transmission, thereby protecting the first oil passageway against a large oil pressure when engine braking is applied.

However, such throttle valves cannot sufficiently reduce the oil pressure in the first oil passageway. Further, if a large transmission ratio (i.e. a low gear side) is produced by the continuously variable transmission immediately before engine braking is applied, the transmission ratio cannot be sufficiently reduced, which means that engine braking is sometimes too effective.

SUMMARY AND OBJECTS OF THE INVENTION

The present invention has been contemplated in order to overcome the foregoing problem of the related art, and is intended to provide a hydraulic-mechanical type continuously variable transmission for a vehicle that can moderate the efficiency of engine braking when the transmission produces a large transmission ratio.

In order to accomplish the foregoing object, the invention provides a hydraulic-mechanical type continuously variable transmission for a vehicle, wherein: a hydraulic pump having an input rotary member connected to a vehicle engine and a hydraulic motor having an output rotational axis coupled to a driving wheel are connected via a first oil passageway that has a low oil pressure during a normal load operation of the vehicle engine but has a high oil pressure during a reverse load operation of the vehicle engine and a second oil passageway that has a high oil pressure during the normal load operation but has a low oil pressure during the reverse load operation; at least either the hydraulic pump or the hydraulic motor has a variable capacity; and a one-way clutch is provided between the input rotary member and the output rotational axis, and couples the input rotary member and the output rotational axis as the number of rotations of the output rotational axis exceeds the number of rotations of the input rotary member during the reverse load operation of the engine.

According to a first feature, the one-way clutch functions to directly couple the input rotary member and the output rotational axis as the input rotary member rotates faster than the output rotational axis during reverse load operations of the engine, i.e. during engine braking. Therefore, even when a large transmission ratio is produced by the continuously variable transmission immediately before engine braking, the output rotational axis and the input rotary member can be coupled without going via the continuously variable transmission, thereby moderating the efficiency of engine braking.

In accordance with a second feature of the present invention, the pressure regulating valves are provided in the first oil passageway in order to prevent the first oil passageway from having an increased oil pressure, in addition to the first feature. In this arrangement, during a reverse load operation, the hydraulic motor functions as a pump while the hydraulic pump functions as a motor. In this state, the hydraulic pump functioning as the motor causes the pressure regulating valves to reduce the oil pressure in the first oil passageway. Therefore, the first oil passageway is prevented from having a very high oil pressure. Further, since the oil pressure is reduced in the first oil passageway before the one-way clutch directly couples the input rotary member and the output rotational axis, it is possible to reduce reverse load applied to the input rotary member via the continuously variable transmission. Therefore, smooth engine braking can be assured by avoiding excessive variations in reverse loads placed on the engine. Still further, the pressure regulating valves are not required to regulate the oil pressure in the first oil passageway until the input rotary member and the output rotational axis are directly coupled via the one-way clutch. This is effective in reducing a load applied to the pressure regulating valves and means that the pressure regulating valves themselves can be made smaller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
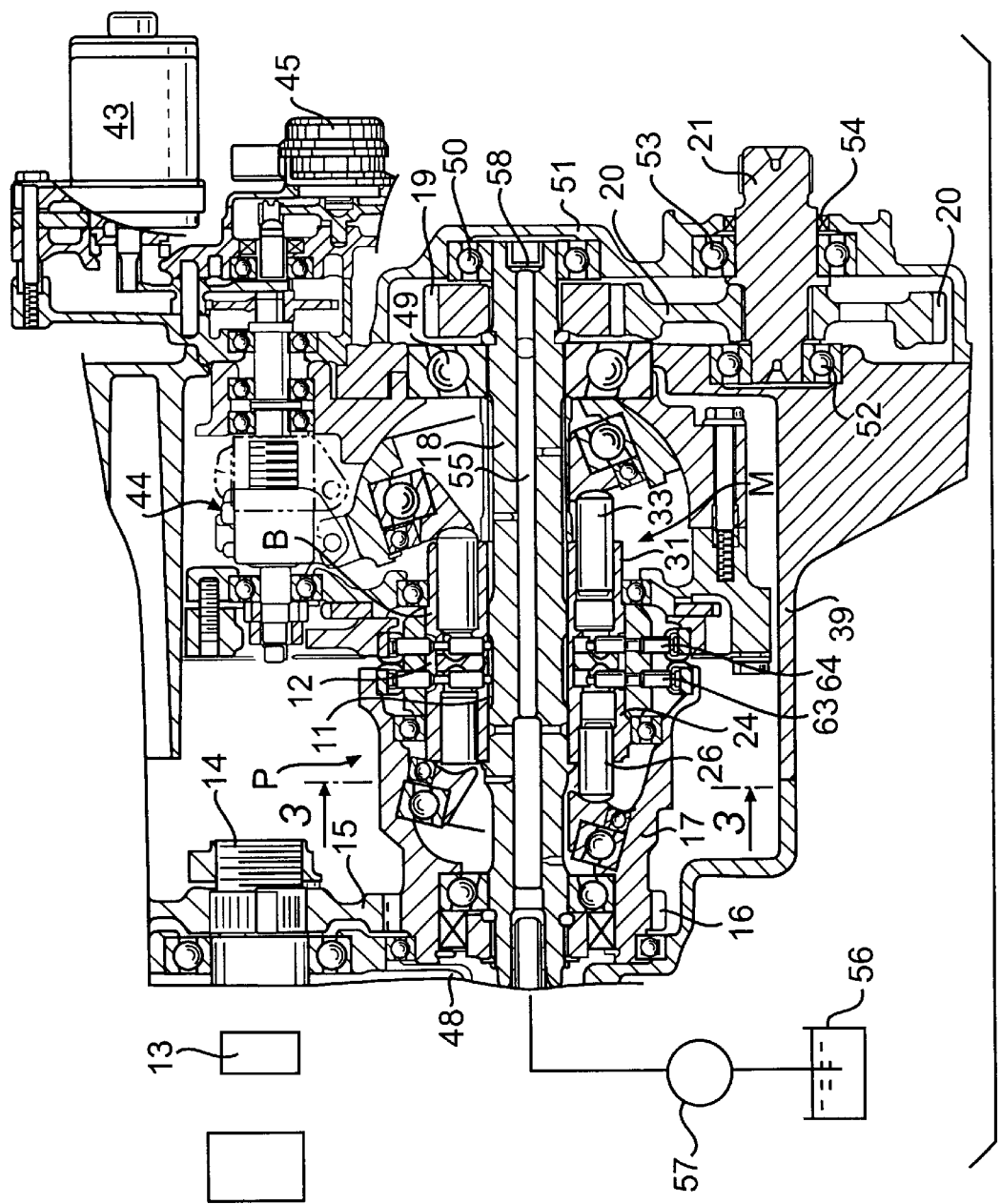
FIG. 1 is a cross section of a continuously variable transmission.

Referring to FIG. 1, the hydraulic-mechanical type continuously variable transmission is constituted by a fixed capacity swash plate-type hydraulic pump P and a variable capacity swash plate-type hydraulic motor M. The hydraulic pump P and the hydraulic motor M are connected via an inner annular oil passageway 11 as a first oil passageway and an outer annular oil passageway 12 as a second oil passageway, thereby constituting a closed hydraulic circuit. The inner annular oil passageway 11 has a low oil pressure during a normal load operation of a vehicle engine but has a high oil pressure during a reverse load operation of the vehicle engine (i.e. when engine braking is applied). On the other hand, the outer annular oil passageway 12 has a high oil pressure during the normal load operation but has a low oil pressure during the reverse load operation.

The internal combustion engine E installed on a motor-cycle is coupled to an input shaft 14 via a starting clutch 13. A gear 15 of the input shaft 14 is engaged with an input gear 16 provided on an input cylindrical shaft 17 as an input rotary member of the hydraulic pump P. An output rotational axis 18 of the hydraulic motor M includes an output gear 19, that is engaged with a gear 20 on an output shaft 21 of a driving wheel (not shown). Specifically, an output of the engine E is transmitted to the driving wheel from the output shaft 21 via the hydraulic pump P and the hydraulic motor M of the continuously variable transmission.

Figure 2:
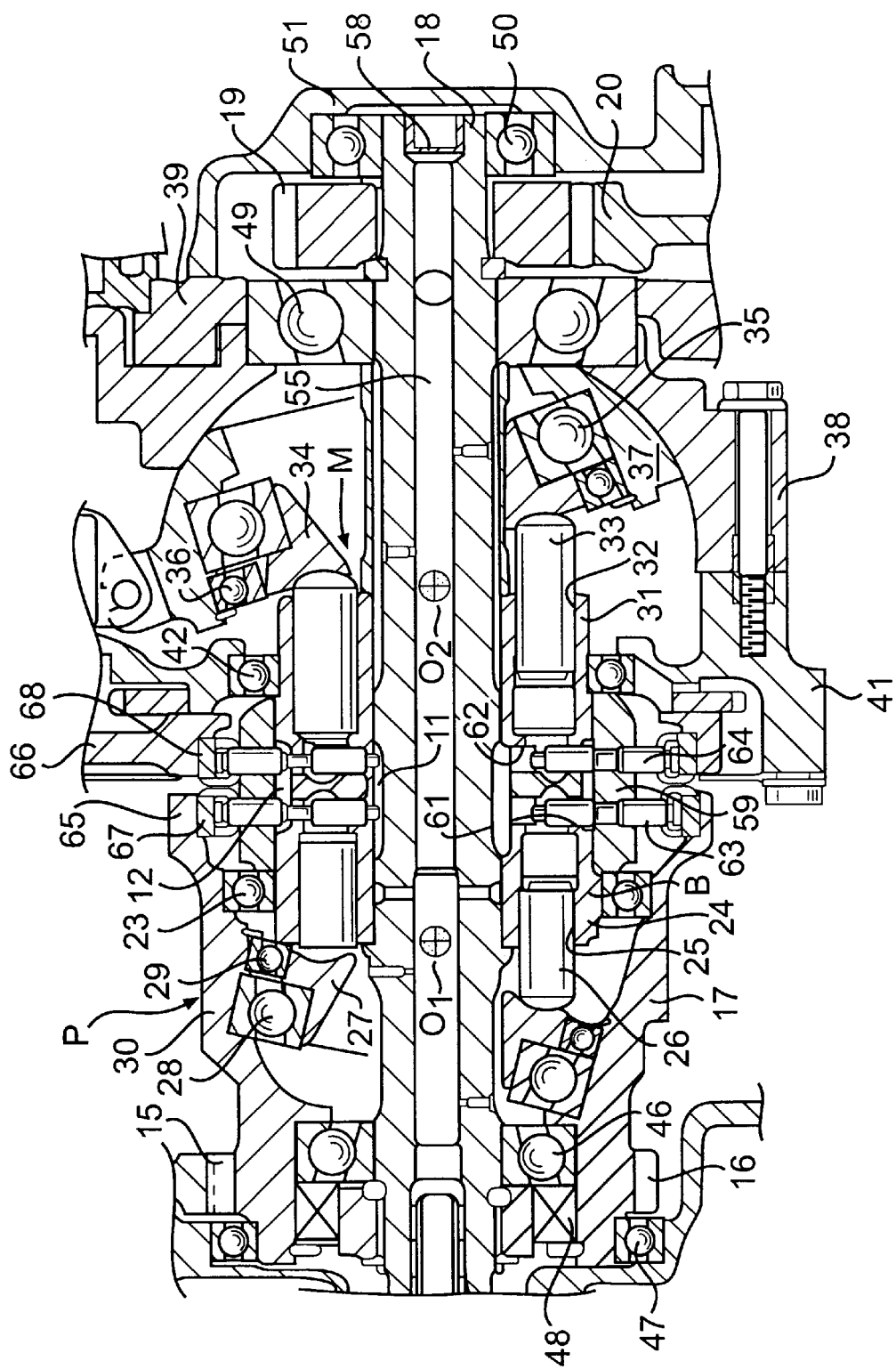
FIG. 2 is an enlarged view of a main part of the continuously variable transmission shown in FIG. 1.

Further referring to FIG. 2, the hydraulic pump P includes: the input cylindrical shaft 17 having the input gear 16; a pump cylinder 24 supported on an inner surface of the input cylindrical shaft 17 via ball bearings 23 in order to be relatively rotatable thereon; a plurality of pump plungers 26 . . . slidably fitted in a plurality of pump cylinder holes 25 . . . which are annularly arranged on the pump cylinder 24 so as to surround the rotary axis thereof; a pump swash plate 27 having a front surface thereof engaged with and brought into contact with outer ends of the pump plungers 26 . . . ; and a holder 30 which supports the pump swash plate 27 via an angular contact bearing 28 and a ball bearing 29 in such a manner that the pump swash plate 27 is inclined with a predetermined angle with respect to the axis of the pump cylinder 24 and disposed around a phantom trunnion axis $O_1$ orthogonal with the axis of the pump cylinder 24. The holder 30 is integral with the input cylindrical shaft 17.

In response to the rotation of the input cylindrical shaft 17, the pump swash plate 27 reciprocates the pump plungers 26 . . . in order to let them perform intake and discharge strokes repeatedly.

The hydraulic motor M includes: a motor cylinder 31 being coaxial with the pump cylinder 24 and positioned at the right side in FIG. 2; a plurality of motor plungers 33 . . . which are slidably fitted in a plurality of motor cylinder holes 32 . . . formed on the motor cylinder 31 in order to surround the rotary axis thereof; a motor swash plate 34 having a front surface thereof in contact with and engaged with outer surfaces of the motor plungers 33 . . . ; a motor swash plate holder 37 for supporting the motor swash plate 34 via an angular contact bearing 35 and a ball bearing 36; and a motor swash plate anchor 38 for supporting the rear surface of the motor swash plate holder 37 and fixed to a casing 39.

An odd number of motor cylinder holes 32 are formed on the motor cylinder 31, and are equal to the number of the pump cylinder holes 25. The motor cylinder holes 32 . . . on the motor cylinder 24 are displaced from the pump cylinder holes 25 . . . . The motor swash plate holder 37 and motor swash plate anchor 38 are in contact with each other via their curved surfaces that are formed around the intersection of the axis of the motor cylinder holder 31 with the trunnion axis $O_2$ in parallel with the foregoing phantom trunnion axis $O_1$. Further, the motor swash plate holder 37 is supported by the motor swash plate anchor 38 in order to be relatively rotatable around the trunnion axis $O_2$.

A cylinder holder 41 continues from an end of the motor swash plate anchor 38 near the motor cylinder 31. A ball bearing 42 is interposed between the cylinder holder 41 and the outer surface of the motor cylinder 31.

As shown in FIG. 1, a pulse motor 43 is attached to the casing 39. The motor swash plate holder 37 is made to rotate round the trunnion axis $O_2$ by a ball screw mechanism 44 coupled to the pulse motor 43, i.e. the holder 37b is movable between an upright position where the plate 34 is at right angles with the axis of the motor cylinder 31 and a maximum inclined position where the plate 34 is inclined by a predetermined angle with respect to the foregoing axis. At the inclined position, the plate 37 causes the reciprocation of the motor plungers 33 . . . , thereby enabling them to repeat the expansion and compression strokes. An operational amount of the pulse motor 43, i.e. the inclined angle of the holder 37, is detected by a sensor 45.

The pump cylinder 24 and motor cylinder 31 are combined to constitute a cylinder block B. The output rotational axis 18 passes through the cylinder block B and is coaxial therewith. In other words, the output rotational axis 18 is spline-connected to the cylinder block B with its one end coaxially arranged in the input cylindrical shaft 17 of the hydraulic pump P.

An angular contact bearing 46 is interposed between this end of the output rotational axis 18 and the input cylindrical shaft 17. Further, a ball bearing 47 is interposed between the input cylindrical shaft 17 and the casing 39.

A one-way clutch 48 is provided between the foregoing end of the output rotational axis 18 and the input cylindrical shaft 17, and couples the input cylindrical shaft 17 and the output rotational axis 18 as the output rotational axis 18 rotates faster than the input cylindrical shaft 17 during the reverse load operation.

The output rotational axis 18 has the other end thereof extending through the motor swash plate 34, motor swash plate holder 37, and motor swash plate anchor 38. The output gear 19 is fixedly attached to the output rotational axis 18 at a position beyond where the output rotational axis 18 passes through the motor swash plate anchor 38. An angular contact bearing 49 is interposed between the output gear 19 and motor swash plate holder 37, between the casing 39, the motor swash plate anchor 38 fixed to the casing 39 and the output rotational axis 18. A cover 51 for supporting the other end of the output rotational axis 18 is attached to the casing 39 via a ball bearing 50. In the cover 51, the output gear 19 of the output rotational axis 18 is engaged with the gear 20 of the output shaft 21. Therefore, the output shaft 21 has its one end supported by the casing 39 via a ball bearing 52 and the other end thereof extending outwardly via the cover 51. A ball bearing 53 and a sealer 54 are provided between the cover 51 and the output shaft 21.

An oil replenishing path 55 is coaxially provided in the output rotational axis 18. Referring to FIG. 1, oil is pumped up by a replenishing pump 57 from an oil reservoir 56, and is supplied to one end of the oil replenishing path 55. The other end of the oil replenishing path 55 is blocked by a cap 58.

The inner annular oil passageway 11 is formed between the inner surface of the cylinder block B and the output rotational axis 18, at a position where the group of pump cylinder holes 25 . . . and the group of the motor cylinder holes 32 . . . are present. Further, the outer annular oil passageway 12 concentrically surrounding the inner annular oil passageway 11 is formed between the outer surface of the cylinder block B and a ring 59 fixed on the outer surface of the cylinder block B.

First and second valve holes 61 . . . and 62 . . . whose numbers are equal to that of the pump cylinder holes 25 . . . are formed in such a manner that they pass through an annular partition between the inner annular oil passageway 11 and the outer annular oil passageway 12 of the cylinder block B and radially pass through the ring 59. Further, the first valve holes 61 . . . are positioned near the pump cylinder holes 25 . . . while the second valve holes 62 . . . are near the motor cylinder holes 32 . . . . The inner annular oil passageway 11 is formed between the pump cylinder holes 25 . . . of the pump cylinder 24, and the outer annular oil passageway 12 is formed between the motor cylinder holes 32 . . . of the motor cylinder 31.

First distributing valves 63 . . . of a spool type are slidably fitted in the first valve holes 61 . . . while second distributing valves 64 . . . of the type same as that of the first distributing valves 63 . . . are slidably fitted in the second valve holes 62 . . . . The first distributing valves 63 . . . have their outer ends in slidable contact with an annular sliding member 67 fixedly attached on an inner surface of a first eccentric ring 65 surrounding the first distributing valves 63 . . . . On the other hand, the second distributing valves 64 . . . have their outer ends in sliding contact with an annular sliding member 68 fixedly attached on an inner surface of a second eccentric ring 66 surrounding the second distributing valves 64 . . . .

The first eccentric ring 65 is integral with the input cylindrical shaft 17, and is eccentric, by a predetermined amount, from the center of the cylinder block B along the phantom trunnion axis $O_1$. The second eccentric ring 66 is positioned in line with the cylinder holder 41, and is eccentric, by a predetermined amount, from the center of the cylinder block B along the trunnion axis $O_2$.

Each first distributing valves 63 operates as described hereinafter. When the input cylindrical shaft 17 and the pump cylinder 24, i.e. the cylinder block B, relatively rotate, each first distributing valve 63 reciprocates between inner and outer positions in the first valve hole 61 as one stroke which is equal to twice the eccentricity of the first eccentric ring 65 with respect to the pump cylinder 24. In a discharge region where a distance between the first eccentric ring 65 and the pump cylinder 24 is small, the first distributing valve 63 moves near the inner position of the first valve hole 61, enables a pump cylinder hole 25 corresponding therewith to communicate with the outer annular oil passageway 12 and disconnects it from the inner annular oil passageway 11. As a result, the pump plunger 26 in the discharge stroke pressure-feeds working oil to the outer annular oil passageway 12 via the pump cylinder hole 25. In an intake region where the distance between the first eccentric ring 65 and the pump cylinder 24 is large, the first distributing valve 63 moves near the outer position, enables the pump cylinder holes 25 to communicate with the inner annular oil passageway 11 and disconnects it from the outer annular oil passageway 12. Therefore, the pump plunger 26 in the intake stroke feeds working oil to the pump cylinder hole 25 via the inner annular oil passageway 11.

The following describes the operation of the second distributing valves 64. In response to the rotation of the motor cylinder 31, i.e. the cylinder block B, each second distributing valve 64 is caused to reciprocate between the inner and outer positions in the second valve hole 62 as a stroke which is equal to twice the eccentricity of the second eccentric ring 66 with respect to the motor cylinder 31. In an expansion stroke where a distance between the second eccentric ring 66 and the motor cylinder 31 is small, the second distributing valve 64 moves near the inner position of the second valve hole 62, enables the motor cylinder hole 32 corresponding therewith to communicate with the outer annular oil passageway 12 and disconnects it from the inner annular oil passageway 11, so that high pressure working oil is fed to the motor cylinder hole 32 of the motor plunger 33 in the expansion stroke via the outer annular oil passageway 12. Conversely, in a compression region where the distance between the second eccentric ring 64 and the motor cylinder 31 is large, the second distributing valve 64 moves near the outer position of the second valve hole 62, enables a corresponding motor cylinder hole 32 to communicate with the inner annular oil passageway 11, and disconnects it from the outer annular oil passageway 12. Therefore, the working oil is fed to the outer annular oil passageway 12 from the motor plunger 32 in the compression stroke.

As described so far, the cylinder block B is rotated in response to a sum of a reaction torque which the pump cylinder 24 receives from the pump swash plate 27 via the pump plunger 26 in the discharge stroke and a reaction torque which the motor cylinder 31 receives from the motor swash plate 34 via the motor plunger 33 in the expansion stroke. A rotation torque of the cylinder block B is transmitted to the driving wheel from the output rotational axis 18 via the output shaft 21.

A transmission ratio of the output rotational axis 18 with respect to the input cylindrical shaft 17 is derived by a formula {1+(capacity of the hydraulic motor M/capacity of the hydraulic pump P)}. Therefore, when the capacity of the hydraulic motor M is changed to a certain value from zero, the transmission ratio can be changed to a desired value from 1. Further, since the capacity of the hydraulic motor M depends upon the stroke of the motor plunger 33, the transmission ratio is continuously variable from 1 to a desired value by inclining the motor swash plate 34 from the upright position to a certain inclined position.

Figure 3:
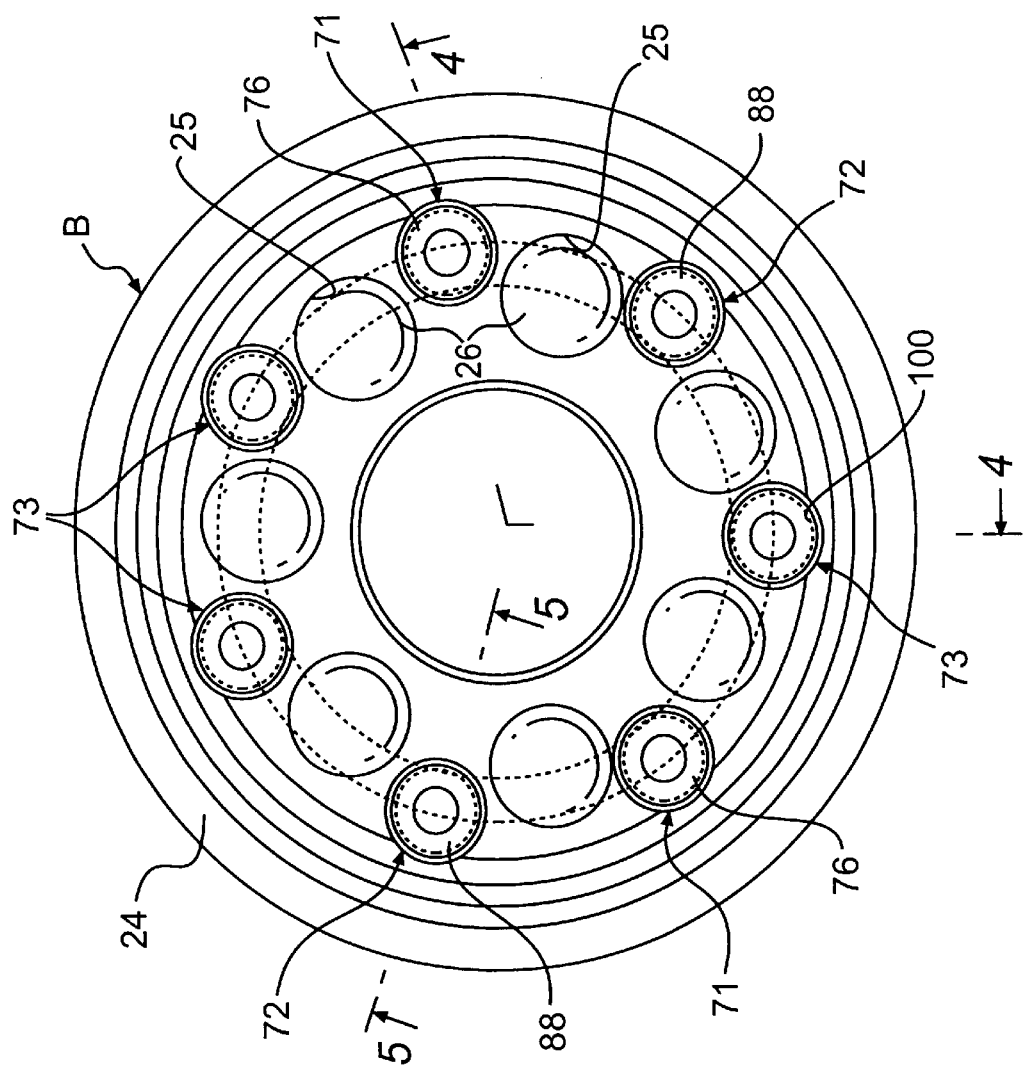
FIG. 3 is a front view of a cylinder block, observed from the direction of arrow 3—3.

Referring to FIG. 3, the pump cylinder 24 is provided with: two first check valves 71, 71 for preventing reverse flow of the working oil in the output rotational axis 18 from the outer annular oil passageway 12 to the oil replenishing path 55; two second check valves 72, 72 for preventing reverse flow of the working oil in the output rotational axis 18 from the inner annular oil passageway 12 to the oil replenishing path 55; and three pressure regulating valves 73, 73 . . . interposed between the inner annular oil passageway 11 and the outer annular oil passageway 12. The first and second check valves 71, 72 and pressure regulating valves 73 . . . are positioned between the pump plungers 26 . . . .

Figure 4:
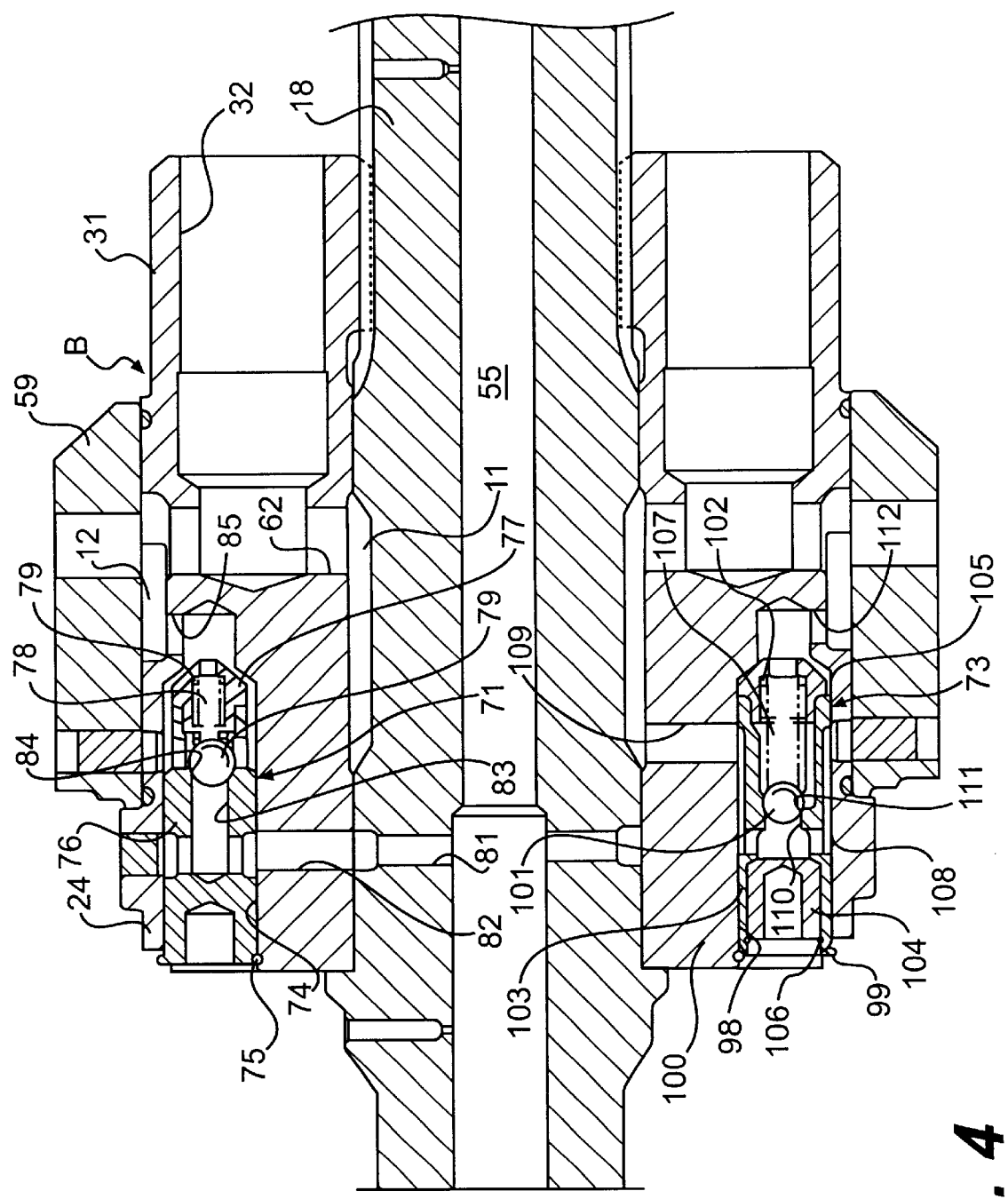
FIG. 4 is an enlarged cross section of the cylinder block and an output rotational axis, taken along line 4—4 in FIG. 3.

Further referring to FIG. 4, each first check valve 71 is provided with: a valve seat member 76 that is fitted in a mounting hole 74 of the pump cylinder 24 and is protected by a stop ring 75 against coming out of the mounting hole 74; a retainer 77 coupled to an inner end of the valve seat member 76 in order to define a valve chamber 78 with the valve seat member 76; a spherical valve 79 housed in the valve chamber 78; and a valve spring 80 interposed in a compressed state between the valve 79 and the retainer 77.

The valve seat member 76 has a valve hole 83 communicating with an oil passageway 81 of the output rotational axis 18 and the oil replenishing path 55 via an oil passageway 82 of the pump cylinder 24, and a valve seat 84 having the valve hole 83 at the center thereof and facing the valve chamber 78. The valve 79 is urged by a valve spring 80 in order to sit on the valve seat 84. The pump cylinder 24 is provided with an oil passageway 85 for providing communication between the valve chamber 78 and the outer annular oil passageway 12.

The first check valves 71 . . . are opened in order to replenish the working oil to the outer annular oil passageway 12 via the oil replenishing path 55 whenever the oil pressure is lowered in the outer annular oil passageway 12.

Figure 5:
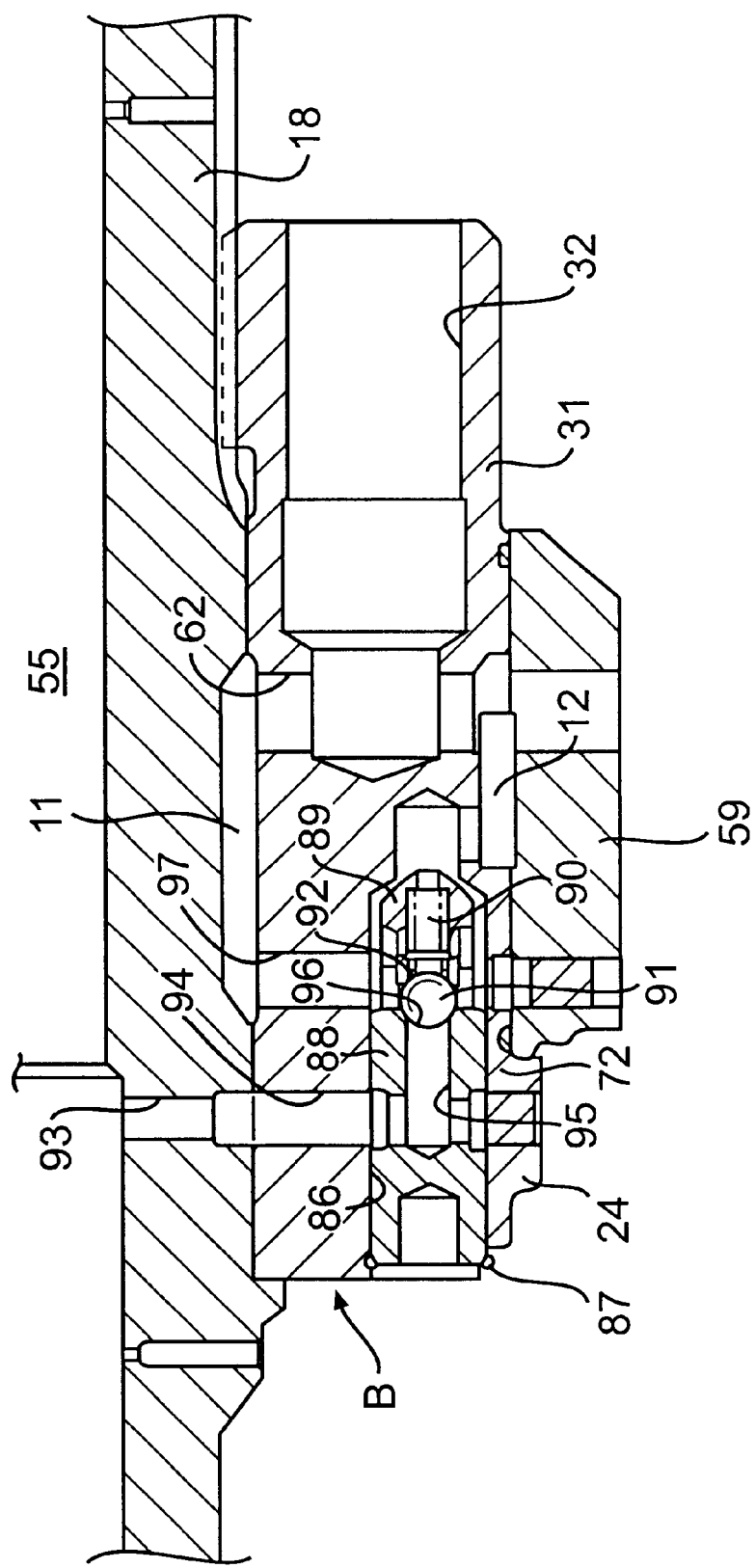
FIG. 5 is an enlarged cross section of the cylinder block and an output rotational axis, taken along line 5—5 in FIG. 3.

Referring to FIG. 5, each second check valve 72 is provided with: a valve seat member 88 that is fitted in a mounting hole 86 of the pump cylinder 24 and is protected by a stop ring 87 against coming out of the mounting hole 86; a retainer 89 coupled to an inner end of the valve seat member 88 in order to define a valve chamber 90 with the valve seat member 88; a spherical valve 91 housed in the valve chamber 90; and a valve spring 92 interposed in a compressed state between the valve 91 and the retainer 89.

The valve seat member 88 has a valve hole 95 communicating with an oil passageway 93 of the output rotational axis 18 and the oil replenishing path 55 via an oil passageway 94 of the pump cylinder 24, and a valve seat 96 having the valve hole 95 at the center thereof and facing the valve chamber 90. The valve 91 is urged by a valve spring 92 in order to sit on the valve seat 96. The pump cylinder 24 is provided with an oil passageway 97 for providing communication between the valve chamber 90 and the inner annular oil passageway 11.

The second check valves 72 . . . are opened in order to replenish the working oil to the inner annular oil passageway 11 via the oil replenishing path 55 whenever the oil pressure is lowered in the inner annular oil passageway 11.

Referring to FIG. 4 again, each pressure regulating valve 73 includes a valve housing 100 that is fitted in a mounting hole 98 of the pump cylinder 24 and is protected by a stop ring 99 against coming out of the mounting hole 98, and a valve spring 102 that urges the valve 101 to open and is housed in the valve housing 100.

The valve housing 100 is constituted by: a cylindrical valve seat member 103; a bottomed cylindrical cap 104 fitted to an outer end of the valve seat member 103 and protected by a stop ring 106 against coming out from the valve seat member 103; and a retainer 105 defining a valve chamber 107 with the valve seat member 103 and coupled to an inner end of the valve seat member 103.

An annular chamber 108 is defined between the outer surface of the valve seat member 103 and the inner surface of the mounting hole 98, communicating with the inner annular oil passageway 11 via an oil passageway 109 provided in the pump cylinder 24. Further, the valve seat member 103 is formed with a valve hole 110 communicating with the annular chamber 108, and a valve seat 111 having the valve hole 110 at its center and facing the valve chamber 107. The valve 101 housed in the valve chamber 107 is urged to sit on the valve seat 111 by the valve spring 102 positioned between the valve 101 and the retainer 105. Further, the pump cylinder 24 is provided with an oil passageway 112 for connecting the valve chamber 107 with the outer annular oil passageway 12.

The pressure regulating valves 73 are opened in order to release the oil pressure from the inner annular oil passageway 11 to the outer annular oil passageway 12 when the oil pressure in the inner annular oil passageway 11 exceeds the predetermined value.

The operation of this embodiment will be described hereinafter. In the hydraulic-mechanical type continuously variable transmission, the input cylindrical shaft 17 of the hydraulic pump P is connected to the internal combustion engine E, and the output rotational axis 18 of the hydraulic motor M is connected to the driving wheel of the motorcycle. The one-way clutch 48 is provided between the input cylindrical shaft 17 and the output rotational axis 18 in order to couple them as the output rotational axis 18 rotates faster than the input cylindrical shaft 17 during the reverse load operation of the engine E. Specifically, during the reverse load operation, i.e. engine braking, the one-way clutch 48 functions to directly couple the input cylindrical shaft 17 and the output rotational axis 18 as the output rotational axis 18 rotates faster than the input cylindrical shaft 17. Therefore, even when a large transmission ratio is produced by the continuously variable transmission immediately before engine braking, the output rotational axis 18 and the input cylindrical shaft 17 are directly coupled without going via the continuously variable transmission, thereby moderating the efficiency of engine braking.

During normal load operations, the inner annular oil passageway 11 has a low oil pressure while the outer annular oil passageway 12 has a high oil pressure. However, during engine braking, the hydraulic motor M functions as a pump while the hydraulic pump P functions as a motor, so that the inner annular oil passageway 11 has a high oil pressure while the outer annular oil passageway 12 has a low oil pressure. The pressure regulating valves 73 . . . are provided between the inner and outer annular oil passageways 11 and 12, and are opened to release the oil pressure of the inner annular oil passageway 11 to the outer annular oil passageway 12 when the oil pressure of the inner annular oil passageway 11 exceeds that of the outer annular oil passageway 12 by a predetermined value or more. Therefore, it is possible to prevent the inner annular oil passageway 11 from having an excessively high oil pressure during engine braking. Further, the oil pressure of the inner annular oil passageway 11 is lowered before the one-way clutch 48 couples the input cylindrical shaft 17 and the output rotational axis 18. Therefore, it is possible to reduce the reverse load applied to the input cylindrical shaft 17 via the continuously variable transmission. It is also possible to prevent the reverse load applied to the internal combustion engine E from extensively varying, which is effective in assuring smooth engine braking. In addition, the pressure regulating valves 73 . . . are simply required to regulate the oil pressure until the output rotational axis 18 and input cylindrical shaft 17 are directly coupled by the one-way clutch 48, which means that the pressure regulating valves 73 . . . may receive small loads and be made smaller accordingly.

Although the preferred embodiment has been shown and described, it should be understood that many changes and modifications may be made therein without departing from the scope of the claims.

For instance, the pressure regulating valves that reduce the oil pressure in the inner annular oil passageway 11 during engine braking may be designed to release the oil pressure in-the inner annular oil passageway 11 outwardly via the cylinder block B.

According to the features of the present invention, the output rotational axis and the input rotary member are directly coupled during engine braking, which is effective in moderating the efficiency of engine braking even when the continuously variable transmission produces a large transmission ratio immediately before engine braking.

In accordance with the present invention, it is possible not only to prevent the first oil passageway from being subjected to a large oil pressure but also to protect the internal combustion engine against a large variation of reverse load, and to assure smooth engine braking. Further, load applied to the pressure regulating valves can be reduced, which is effective in making the pressure regulating valves smaller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic-mechanical type continuously variable transmission for a vehicle, comprising:
    a hydraulic pump having an input rotary member and a hydraulic motor having an output rotational axis, said hydraulic pump and said hydraulic motor being connected via a first oil passageway having a low oil pressure during a normal load operation, said first oil passageway having a high oil pressure during a reverse load operation and a second oil passageway having a high oil pressure during the normal load operation but having a low oil pressure during the reverse load operation;
    at least one of the hydraulic pump and the hydraulic motor having a variable capacity; and
    a one-way clutch provided between the input rotary member and the output rotational axis, said one-way clutch providing a coupling between the input rotary member and the output rotational axis as the number of rotations of the output rotational axis exceeds the number of rotations of the input rotary member during the reverse load operation of the engine.

2. The variably continuous transmission according to claim 1, wherein pressure regulating valves are connected to the first oil passageway for preventing the first oil passageway from having an excessively large oil pressure.

3. The variably continuous transmission according to claim 1, wherein said hydraulic pump includes a pump swash plate being disposed at a predetermined angle relative to said input rotary member and a pump cylinder secured to said output rotational axis, a plurality of pump plungers are operatively positioned within respective pump cylinder holes disposed within said pump cylinder for selectively supplying oil from said first oil passageway to said second oil passageway.

4. The variably continuous transmission according to claim 3, and further including a first distributing valve operatively positioned relative to said input rotary member and said first oil passageway for selectively providing communication between said first oil passageway and said second oil passageway.

5. The variably continuous transmission according to claim 4, and further including a pressure regulating valve operatively mounted relative to said first distributing valve and said first oil passageway for preventing the first oil passageway from having an excessively large oil pressure.

6. The variably continuous transmission according to claim 1, wherein said first oil passageway is formed in an outer peripheral surface of said output rotary axis.

7. The variably continuous transmission according to claim 1, and further including a pump cylinder and a motor cylinder, said pump cylinder and said motor cylinder being mounted on an outer peripheral surface of said output rotational axis at a position adjacent to said first oil passageway.

8. The variably continuous transmission according to claim 7, and further including a ring being disposed around an outer peripheral surface of said pump cylinder and said motor cylinder, said second oil passageway being formed in said outer peripheral surface of at least one of said motor cylinder and said pump cylinder with said ring forming a portion of said second oil passageway.

9. The variably continuous transmission according to claim 1, wherein said hydraulic motor includes a motor swash plate being disposed at a predetermined angle relative to said output rotational axis and a motor cylinder secured to said output rotational axis, a plurality of motor plungers are operatively positioned within respective motor cylinder holes disposed within said motor cylinder for selectively supplying oil from said first oil passageway to said second oil passageway.

10. The variably continuous transmission according to claim 9, and further including a second distributing valve operatively positioned relative to a cylinder holder disposed around said output rotational axis and said first oil passageway for selectively providing communication between said first oil passageway and said second oil passageway.

11. A hydraulic-mechanical type continuously variable transmission for a vehicle, comprising:
    a hydraulic pump having an input rotary member and a hydraulic motor having an output rotational axis, said hydraulic pump and said hydraulic motor being connected via a first oil passageway having a low oil pressure during a normal load operation, said first oil passageway having a high oil pressure during a reverse load operation and a second oil passageway having a high oil pressure during the normal load operation but having a low oil pressure during the reverse load operation;
    at least one of the hydraulic pump and the hydraulic motor having a variable capacity;
    an oil replenishing path and an oil replenishing pump for supplying oil to said first oil passageway; and
    a one-way clutch provided between the input rotary member and the output rotational axis, said one-way clutch providing a coupling between the input rotary member and the output rotational axis as the number of rotations of the output rotational axis exceeds the number of rotations of the input rotary member during the reverse load operation of the engine.

12. The variably continuous transmission according to claim 11, wherein pressure regulating valves are connected to the first oil passageway for preventing the first oil passageway from having an excessively large oil pressure.

13. The variably continuous transmission according to claim 11, wherein said hydraulic pump includes a pump swash plate being disposed at a predetermined angle relative to said input rotary member and a pump cylinder secured to said output rotational axis, a plurality of pump plungers are operatively positioned within respective pump cylinder holes disposed within said pump cylinder for selectively supplying oil from said first oil passageway to said second oil passageway.

14. The variably continuous transmission according to claim 13, and further including a first distributing valve operatively positioned relative to said input rotary member and said first oil passageway for selectively providing communication between said first oil passageway and said second oil passageway.

15. The variably continuous transmission according to claim 14, and further including a pressure regulating valve operatively mounted relative to said first distributing valve and said first oil passageway for preventing the first oil passageway from having an excessively large oil pressure.

16. The variably continuous transmission according to claim 11, wherein said first oil passageway is formed in an outer peripheral surface of said output rotary axis.

17. The variably continuous transmission according to claim 11, and further including a pump cylinder and a motor cylinder, said pump cylinder and said motor cylinder being mounted on an outer peripheral surface of said output rotational axis at a position adjacent to said first oil passageway.

18. The variably continuous transmission according to claim 17, and further including a ring being disposed around an outer peripheral surface of said pump cylinder and said motor cylinder, said second oil passageway being formed in said outer peripheral surface of at least one of said motor cylinder and said pump cylinder with said ring forming a portion of said second oil passageway.

19. The variably continuous transmission according to claim 11, wherein said hydraulic motor includes a motor swash plate being disposed at a predetermined angle relative to said output rotational axis and a motor cylinder secured to said output rotational axis, a plurality of motor plungers are operatively positioned within respective motor cylinder holes disposed within said motor cylinder for selectively supplying oil from said first oil passageway to said second oil passageway.

20. The variably continuous transmission according to claim 19, and further including a second distributing valve operatively positioned relative to a cylinder holder disposed around said output rotational axis and said first oil passageway for selectively providing communication between said first oil passageway and said second oil passageway.

* * * * *